United States Patent [19]

Myer

[11] Patent Number: 4,584,464
[45] Date of Patent: Apr. 22, 1986

[54] HEATING ELEMENT

[75] Inventor: Jon H. Myer, Woodland Hills, Calif.

[73] Assignee: Hughes Aircraft Co., Los Angeles, Calif.

[21] Appl. No.: 627,146

[22] Filed: Jul. 2, 1984

[51] Int. Cl.$^4$ .......................... F24H 3/00; H05B 1/00; H01C 3/10

[52] U.S. Cl. .................................. 219/354; 219/552; 65/12; 338/280; 338/283

[58] Field of Search ............... 219/354, 353, 357, 549, 219/535, 366, 388 S, 388, 552; 65/12, 18.1, 18.2, 144, 271, 292; 338/283, 284, 279, 280, 281, 214

[56] References Cited

U.S. PATENT DOCUMENTS

| | | | |
|---|---|---|---|
| 2,641,682 | 6/1953 | McKenna | 219/10.79 |
| 2,688,067 | 8/1954 | Sonnino et al. | 219/388 S |
| 3,449,549 | 6/1969 | Isabe et al. | 219/388 S |
| 3,525,850 | 8/1970 | Hager, Jr. | 219/357 |

Primary Examiner—C. L. Albritton
Assistant Examiner—M. M. Lateef
Attorney, Agent, or Firm—Lewis B. Sternfels; A. W. Karambelas; Victor G. Laslo

[57] ABSTRACT

An electrically energizable high intensity, radiant energy heater (8) having a general M-shape for providing a pocket (20) for localized high intensity isothermal heating for fusion and fiber processing. The heater is shaped to provide easy access for a fiber (18) at an entry (16) to enable insertion of the fiber into the isothermal high temperature zone in pocket (20). A second re-entrant wall external to the pocket provides radiant shielding and buffers the isothermal heating zone from the cool environment. The heater may be constructed from a ribbon of a resistively heated metal, such as platinum foil.

33 Claims, 2 Drawing Figures

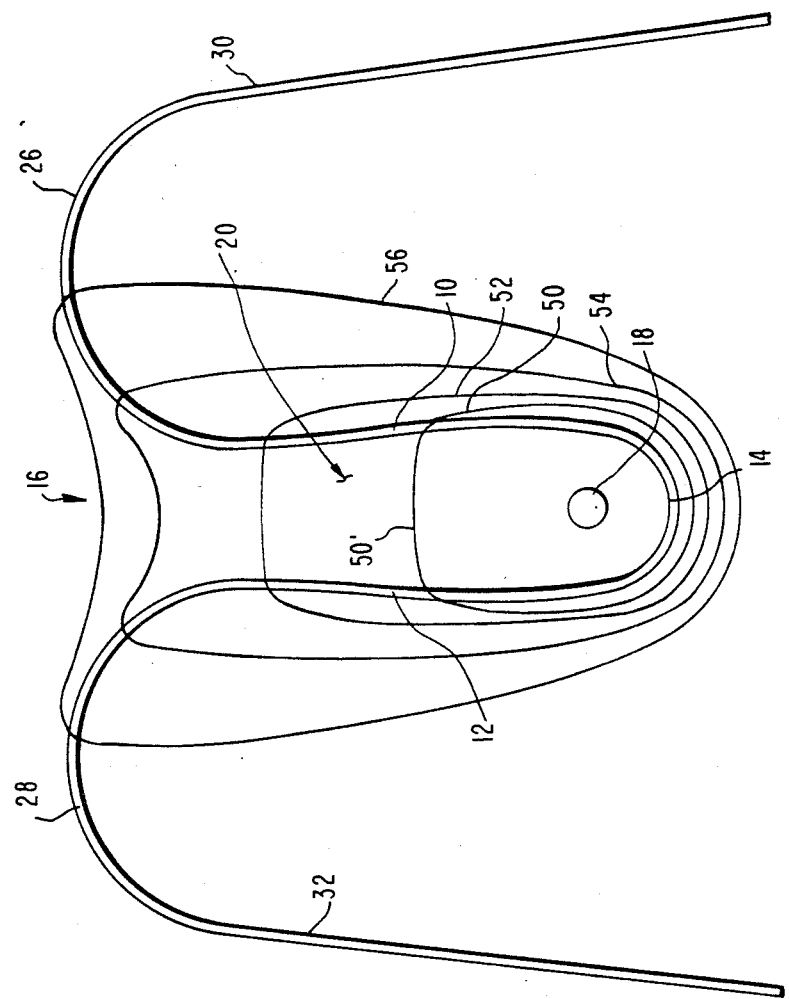

4,584,464

HEATING ELEMENT

The Government has rights in this invention pursuant to Contract No. F04701-77-C-0100 awarded by the Department of the Air Force.

BACKGROUND OF THE INVENTION

1. Field of the Invention

This invention relates in general to certain new and useful improvments in heating elements and, more particularly, to a method and apparatus using a high intensity, radiant energy heater operable in a normal ambient environment and capable of providing a high temperature isothermal region for tapering and fusing optical fibers.

2. Description of the Prior Art

In the processing of fibers, and particularly in the tapering and fusion of optical fibers, such as glass and quartz fibers, high intensity controlled temperature heating is required. Temperatures at least high enough to cause melting and some material flow of the fiber are required. When it is desired to fuse together two or more such fibers, the parallel fibers are heated to a relatively high temperature, e.g. 1,500° C. to about 2,000° C. Fibers thus formed and processed are effective as optical couplers, mixers, taps and attenuators.

In the processing of these optical fiber devices, it is necessary to fuse parallel fibers together and pull the fibers lengthwise to stretch and taper them under conditions of precisely controlled time and temperature. Such a taper may be formed intermediate or at the ends of the fibers. To create uniformity in the taper, a portion of the fiber is heated and pulled evenly. The taper is generally conical and is effective in reducing higher order modes of radiation in the fiber when used as a waveguide. It is often necessary to heat fibers over a substantial length, and the entire heated zone of the fibers must be at a uniformly high temperature during processing. It is also preferable that the fusion be conducted in an ambient atmosphere environment to facilitate ease of the fusion and other processing and to avoid the need for atmospherically controlled enclosures and special handling equipment.

Heretofore, high intensity flame heating was employed to heat parallel fibers for purposes of fusing them. However, flame heating is undesirable inasmuch as the flame itself contains impurities from the combustible source, and these impurities are introduced into the fibers during heating. Such contamination is highly undesirable, since the impurities increase the optical absorption in the fiber and, consequently, the attenuation of the optical signal in the fiber.

In the prior art, tubular heaters have also been employed. These tubular heaters comprise a cylindrically shaped heating element through which a fiber is passed and heated. A major disadvantage is that loading procedures require the fibers to be threaded through the tube. Such threading is time consuming, especially for fibers of multikilometer length. Clam-shell heaters have also been used, but these heaters are difficult to miniaturize and, when miniaturized, cannot provide the required isothermal environment.

Electric arc heating has also been employed and, while found useful for butt joining fibers, it cannot provide a long isothermal zone for parallel fusing of fibers with uniform and reproducible results, necessary in a production application.

Effective tapering has proved to be a substantial problem in that there has been no effective means or method to provide a uniform taper over a lengthy zone (e.g., more than one centimeter) of the fiber, and no means or method exists which is able to provide a taper on a reproducible basis with a high degree of uniformity. In order to accomplish the tapering in the prior art, flames and flame spreaders have been used. However, as indicated, the use of flames introduces undesirable impurities into the fibers. Further, since the heat of a flame is not uniform, the elongation and constriction resulting from pulling in a flame is not uniform and, hence, the resulting tapers are not uniform. Indeed, it has been found that only one out of fifty attempted tapers are acceptable and reproducible when using a flame and flame spreader.

As a result of these and other problems, effective heating of fibers in ambient atmosphere for their reproducible fusing and uniform tapering has heretofore not been available.

SUMMARY OF THE INVENTION

The above and other problems are overcome by the provision of a high intensity radiant energy heater which is preferably heated by electrical resistance and which is capable of operating in ambient atmosphere to provide a high temperture isothermal environment or zone for fiber fusion and tapering.

The heater generally comprises a shaped metal ribbon having a pair of side walls spaced apart from each other by a distance at least sufficient to receive a fiber. A bight portion or connecting wall connects end portions of the side walls together to form an elongate slot therebetween. The open end opposite the bight portion permits introduction of a fiber into the heating zone. Further, the portion of the two side walls adjacent the bight portion provides a large isothermal region which is ideal for heating of a relatively large length of the fiber. With this construction, it is possible to heat isothermally a lengthwise dimension of fibers equal to at least 50 to 100 times the diameter of the fibers.

In a preferred embodiment, heat loss reducing walls are respectively outwardly from, and generally parallel to, each one of the side walls. The heat loss reducing walls are connected to their respective side walls by connecting wall sections. These heat loss reducing walls reduce the external radiant loss from the isothermal region within the side walls by buffering this region from the cooler environment.

The heater is formed from a strip of a desired metal and bent to the desired configuration or shape. Thus, the heater is easily fabricated and provides all of the advantages described herein.

The present invention is also embodied as a method for pulling fibers using the disclosed heating element by placing the fibers under tension, thereafter heating them in the isothermal zone, and applying tension while being heated therein.

With the heater construction of the present invention, access to a large high temperature isothermal zone is facilitated with minimum heat loss to the environment. This easy access simplifies processing and eliminates the need for threading the fiber through the heater. The heater itself can be manufactured by simple tooling, and its simple construction assures ruggedness and consequent reduciton in initial, life cycle and other costs.

This invention possesses many other advantages and has other purposes which will become more clearly apparent from a consideration of the forms in which it may be embodied as, for example, shown in the drawings forming part of and accompanying the present specification.

While described in detail for purposes of illustrating the general principles of the invention, it is to be understood that such detailed description is not to be taken in a limiting sense.

BRIEF DESCRIPTION OF THE DRAWINGS

Figure 1:
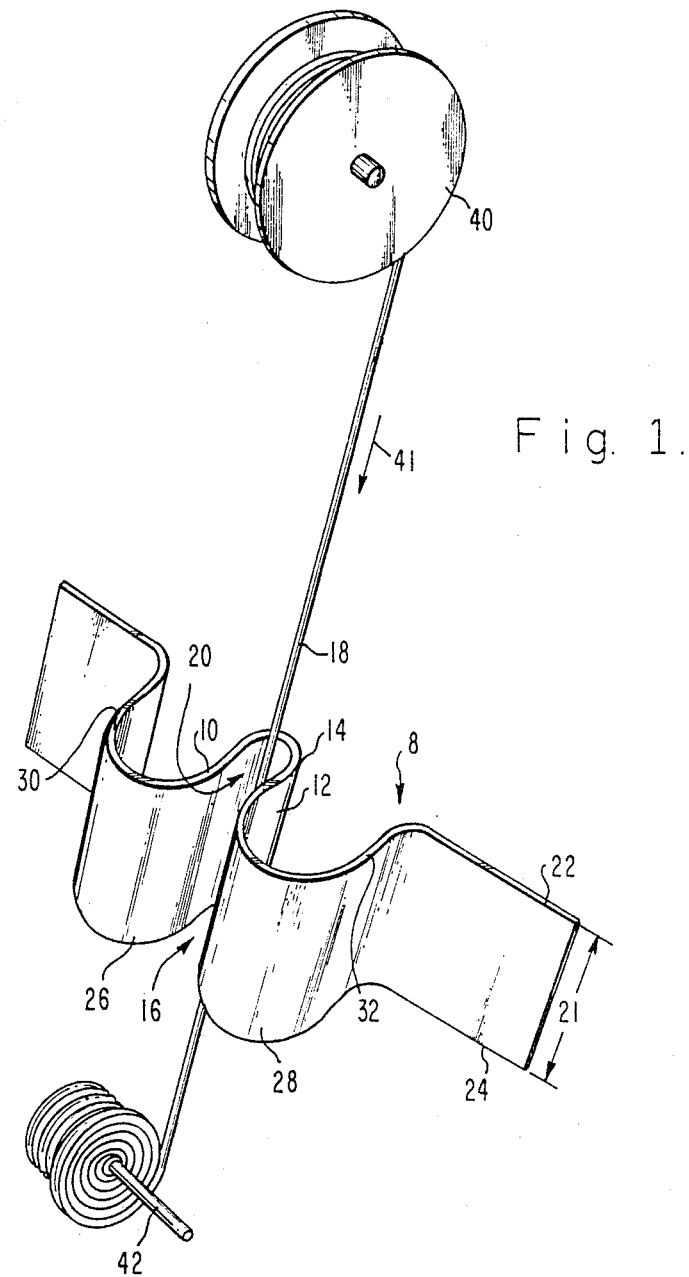

Having thus described the invention in general terms, reference will now be made to the accompanying drawings in which:

FIG. 1 is a perspective view showing a radiant energy heater constructed in accordance with and embodying the present invention and heating a selected zone of a continuous fiber; and FIG. 2 is a graphical illustration showing the existence of the large, high temperature isothermal region or zone provided by the heater of the present invention.

DETAILED DESCRIPTION OF THE INVENTION

Referring now in more detail and by reference characters to the drawings which illustrate a preferred embodiment of the present invention, an electrically energizable high intensity radiant energy heater 8 has an overall M-shaped configuratin, with an generally U-shaped internal portion, as illustrated in FIG. 1.

Heater 8 generally comprises a continuous metallic ribbon forming a pair of spaced apart side walls 10 and 12, referred to as recess-forming walls. Side walls 10 and 12 are integrally connected by a connecting wall or bight 14 to provide an opposite open or entrance end 16 for introduction of a fiber 18. The spaced apart side walls 10 and 12 along with the connecting wall 14 therefore provide a generally U-shaped configuration having an internal enlarged slot or pocket 20 general tubular shape which enables a large high temperature isothermal region or zone of a generally tubular shape adjacent wall 14 to be formed and into which lengthwise extending fiber 18 is received.

Heater 8 is conveniently fabricated from a strip of electrically conductive material capable of being resistively heated when an electrical current is passed through it. The strip has a width 21, which is defined by longitudinal margins 22 and 24, and is relatively wide with respect to the fiber. Thus, slot 20 formed by heater 8 comprises a pair of transversely spaced apart open ends at end margins 22 and 24, connected by entrance end 16. In addition, the width of walls 10 and 12, as measured from margin 22 to margin 24, is substantially greater than the dimension between walls 10 and 12. In a preferred embodiment, the dimension between margins 22 and 24 is at least 100 times greater than the diameter of any fiber 18 normally received.

As a consequence of the configuration of the strip, the zone within pocket 20 defining the high temperature isothermal heating region, is located close to connecting wall 14 and constitutes the hottest region in pocket 20. Entrance 16, which is relatively cooler compared to the high temperature zone, preferably is wider than the diameter of fiber 18 to permit easy introduction of the fiber, but is narrower than pocket 20. The dimension between side walls 10 and 12 near connecting wall 14 is therefore greater than at entrance end 16 so that the entrance end has a smaller opening to reduce radiative heat loss to the external cooler environment.

In order further to reduce radiant energy heat losses to the environment at entrance end 16, each of the ends of side walls 10 and 12 integrally merge, through arcuate connecting walls 26 and 28; respectively into outer spaced apart heat loss reduction walls 30 and 32, which act as thermal radiation shields and buffers. These heat loss reduction walls 30 and 32 are generally parallel to and slightly spaced apart from side walls 10 and 12. The spacing between each heat loss reducing wall and the associated end wall is approximately equal to one to three times the dimension between side walls 10 and 12. This construction, including side walls 10 and 12, connecting wall 14, spaced apart heat loss reduction walls 30 and 32 and opposite connecting wall sections 26 and 28, provide an overall "M" shaped ribbon configuration, as illustrated in FIG.1.

Connecting wall sections 26 and 28 are effective in helping to maintain a relatively constant temperature throughout pocket 20 because they provide for heat generation adjacent entrance end 16. Inasmuch as entrance end 16 is in open communication with the environment, in the absence of arcuate connecting wall sections 26 and 28 generating heat and the narrow opening at 16, the entrance end would permit the loss of substantial heat. However, because heat loss reduction walls 30 and 32 are sufficiently close to side walls 10 and 12 so as to maintain a heated region between the heat loss reduction walls and the associated side walls, the high temperature isothermal region within the recess of pocket 20 is maintained.

Ribbon form heating element 8, as stated above, has a substantial width 21 relative to the dimension of pocket 20 between side walls 10 and 12. In addition, the respective dimensions between side walls 10 and 12 and their associated outer walls 30 and 32, are each about one to three times the dimension between side walls 10 and 12 and, preferably, one and one-half times this dimension. Further, ribbon width 21 is about two to six times the dimension between side walls 10 and 12. The depth of the pocket, from entrance end 16 to connecting wall 14 is about the same as the width of the band.

This strip, band or ribbon of refractory, electrically conductive metal is sufficiently thin so that it can be easily formed by wrapping it around pins or like patterning tools in order to achieve the illustrated "M-shaped" configuration. However, the deformed ribbon has sufficient thickness to maintain its structural integrity in its bent configuration after being formed.

The ribbon may be made from one of several different metals and metal alloys, such as of platinum or platinum alloy, or, preferably, an alloy of platinum and about 12 percent rhodium. Such an alloy has a very high melting point, is not affected by the atmosphere and has good electrical conductivity.

While the present invention is highly effective and efficient since fiber fusion and processing can be performed in a normal atmospheric environment, it is also possible to use the heater of the present invention in a controlled atmosphere, particularly where specific heater metals are oxidizable or otherwise degradable in normal atmosphere. Thus, where it is desired to operate at a temperature above the melting point of platinum-rhodium, the ribbon can be formed of tungsten foil, permitting the softening and tapering of quartz fibers. However, in this case, some protective atmosphere must be provided to inhibit oxidation. If desired, the heating can be performed in a vacuum chamber or in an inert gas environment, such as argon or helium.

The fiber can be conveniently dispensed from a spool 40 and initially slipped into pocket 20 through entrance opening 16. Fiber 18 is continuously pulled through pocket 20 and particularly through the isothermal region therein in the direction of arrow 41 or may be introduced into the pocket as desired and wrapped about a take-up rod 42 until the section, which needs to be heated, is located in the isothermal region. As the fiber is heated, it can be pulled with uniform tension in order to create the desired amount of localized taper or elongation of the fiber alone or fused with one or more fibers. After the fiber has been locally stretched and/or a second fiber fused to it in the isothermal heating zone, the power is switched off to permit cooling of the processed fiber in the zone and to prevent further elongation or distortion thereof.

With the radiant energy heater of the present invention, it is possible to produce optical fiber couplers, mixers and taps and to fuse these fibers at high temperatures with precisely controlled cycles of operating time and temperature. In this way, reproducibility is high, and tolerances are easily controlled. The ribbon heater, with the shape as shown, provides a controlled high temperature isothermal zone for both fiber fusion and heating for fiber pulling and tapering. The depth of pocket 20 is sufficiently large and the width of the opening is sufficiently small to reduce heat loss to the environment since the high temperature isothermal zone is positioned near end wall 14 and is nearly completely surrounded by hot ribbon walls. Open end 20 is narrow to reduce radiant heat loss as aforesaid, but sill permits easy introduction of a fiber therein. Thus, the conflicting requirements of an easily accessible heating zone along with the requirements for isothermal heating at very high temperatures and the attendant necessity of easy and convenient introduction and removal of a fiber into and from the heating zone, have been met by the present invention.

In one of the preferred embodiments of the invention, the heating element, which is formed of a platinum 12% rhodium ribbon, has a width of approximately 19 millimeters (¾ inch) and a thickness of about 0.15 millimeter (6 mils). The overall distance between the loss reduction walls 30 and 32 can be 3 centimeters or less, permitting the entire heater to have a compact shape.

When a current of 100 amperes and approximately 8 volts is applied to the heating ribbon, a temperature can be generated which is sufficiently high to soften and successfully taper optical fibers which are placed in the recess. The fibers, which are heated and pulled or fused, generally have a core diameter of about 50 micrometers and an outer diameter of about 125 micrometers. The resistively heated platinum ribbon, which is alloyed with rhodium, is highly effective in generating temperatures to 1,800° C. in the isothermal region. For higher temperature heating, such as required for quartz, it is preferable to form the heating element of tungsten and utilize a protective inert gas atmosphere in order to achieve an isothermal heating zone of 2,000° C. and above.

FIG. 2 illustrates the profile of the heating element and the isothermal heating zone which is created thereby. The various isotherms designated by indicia 50, 52, 54 and 56 have a generally tubular shape show the generation of a large, high temperature region in the interior of pocket 20. Isotherms 50, 52, 54 and 56 are each spaced closely together along the exterior of bight 14 which indicates a generally tubularly shaped very large temperature gradient in that region. The isotherm located within pocket 20, and designed as 50', indicates that the high temperature working region is isothermal over a relatively large area.

The present invention also provides a unique method of pulling in conjunction with the heating element of the present invention. In accordance with this method, the fiber is pre-tensed, that is, it is placed under tension when inserted into the isothermal heating zone where the temperature is raised to about 1,700° C. to 1,800° C. While in the heating zone, tension is continuously applied so as to cause the fiber to lengthen. Duration of the heating cycle may be as short as a few seconds. Thereafter, the heating element is deenergized and the temperature drops rapidly to enable the cooled fused or reformed fiber to retain its drawn shape and size. In another embodiment of the invention, the fiber is preheated for a few seconds before the tension is applied.

Thus, there has been illustrated and described a unique and novel high intensity radiant energy heater and a method of processing fibers therewith, which is capable of providing an isothermal high temperature heating environment for fiber fusion and fiber processing and which is operable in a controlled or an ambient environment. Thus, the present invention fulfills all of the advantages which have been sought. It should be understood that many changes, modifications, variations, and other uses and applications will become apparent to those skilled in the art after considering the specification and the accompnaying drawings. Therefore, any and all such changes, modifications, variations and other uses which do not depart from the spirit and scope of the invention are deemed to be covered by the invention which is limited only by the following claims.

What is claimed is:

1. An electrically energizable high intensity radiant energy heater capable of operating in normal and controlled atmospheric environments and of providing as isothermal high temperature region for fiber fusion and fiber processing of optic fibers having longitudinal axes, comprising an enclosure having a configuration for receiving at least one of the optic fibers, said enclosure configuration defining a substantially enclosed elongated generally tubularly-shaped pocket enabling the the formation of generally tubularly-shaped isotherms spaced closely together for providing the isothermal high temperature region in said enclosure, and entry means in said enclosure for enabling the optic fiber to be moved in a direction at an angle to the fiber axis into the isothermal high temperature region within said enclosure.

2. A heater according to claim 1 in which said enclosure comprises a unitary heating element and said entry comprises an opening therein.

3. A heater according to claim 1 in which said enclosure includes a generally U-shaped heating element having open and closed ends and walls extending therebetween, with the isothermal high temperature region located near said closed end and said entry at said open end.

4. A heater according to claim 3 in which said open end entry is relatively small with respect to said closed end to protect against heat loss from the isothermal high temperature region.

5. A heater according to claim 4 in which said enclosure includes further walls extending respectively along side said first-mentioned walls further to provide radiant shielding and buffering of the isothermal high temperature region, thereby to protect against the heat loss.

6. A heater according to claim 5 in which said enclosure comprises an electrically conductive band having a width which is relatively large with respect to said closed end.

7. A heater according to claim 1 in which said enclosure comprises a ribbon of heated material having a pair of side walls which are spaced apart from each other by a distance sufficient to receive the fiber, a connecting wall connecting end portions of said side walls to form an elongate slot therebetween with an open end opposite said connecting wall, the isothermal region residing in the slot.

8. A heater according to claim 1 wherein said side walls have a dimension in the direction of the fiber axis, which dimension is substantially greater than the distance between said walls.

9. A heater according to claim 8 wherein said side walls have a dimension in the direction of the fiber axis, which dimension is at least two times greater than the dimension between said side walls.

10. A heater according to claim 8 wherein said side walls have a dimension in the direction of the axis of the fiber which is at least four times that of the dimension between said side walls.

11. A heater according to claim 8 wherein the dimension between said side walls at said open end is less than the dimension between said side walls adjacent said connecting end walls.

12. A heater according to claim 7 wherein the heater is comprised of a strip of platinum.

13. A heater according to claim 7 wherein said ribbon comprises a strip of an alloy of platinum and about 12 percent of rhodium.

14. A heater according to claim 7 wherein said ribbon comprises an electrically resistive material capable of providing a temperature of 1800° C. when heated.

15. A heater according to claim 7 further including first and second additional walls spaced outwardly respectively from said side walls to provide radiant shielding and buffering of the isothermal high temperature region from cooling.

16. A heater according to claim 15 further including additional connecting wall sections positioned adjacent to and on either side of the open end and respectively connecting said first and second additional walls to said side walls.

17. An electrically energizable high intensity radiant energy heater capable of operating in a normal ambient environment and providing a high temperature isothermal region for fiber fusion and fiber processing, said heater comprising a shaped metal ribbon having an elongate generally U-shaped slot structure formed therein, said slot structure having transversely spaced-apart open ends and a connecting end which extends between said transversely spaced apart open ends, said slot structure having an elongate dimension between said transversely spaced apart open ends which is sufficient to prevent substantial heat loss and maintenance of the high temperature in the isothermal region, the depth of said slot structure from said open connecting end to a closed wall opposite said open connecting end also being sufficient to provide a radiation shield with respect to the external environment, the dimension of said slot structure in a direction perpendicular to the direction between said open ends being substantially less at said open connecting end than at a portion opposite said open connecting end, but which is still sufficiently large to receive a fiber therein.

18. A heater according to claim 17 wherein the dimension of said slot structure between two opposed faces extending between said transversely spaced apart open ends is less than the dimension between said transversely spaced apart ends.

19. A heater according to claim 18 wherein the dimension between said two transversely spaced apart open ends is at least two times greater than the dimension between said faces.

20. An electrically energizable high intensity radian energy heater capable of operating in normal ambient environment and providing a high temperature isothermal region for fiber fusion and fiber processing, said heater comprising a pair of side walls which are spaced apart from each other by a distance to receive a fiber and which side walls form a pair of transversely spaced apart open ends, a connecting wall integrally connecting said side walls to form an elongate slot therebetween with an open end opposite said connecting wall and which slot forms an isothermal region therein, the thickness of said side walls and connecting wall being substantially less than the dimension between said side walls, a first heat loss reducing wall connected to and spaced outwardly from a first of said side walls in generally parallel relationship thereto and being spaced from said side walls by a dimension at least one and one-half times the dimension between said side walls, and a second heat loss reducing wall spaced outwardly from a second of said walls in generally parallel relationship thereto and being spaced from said second side wall by a dimension at least one and one-half times the dimension between said side walls.

21. A heater according to claim 20 wherein a first connecting wall section connects said first heat loss reducing wall to the side wall from which it is spaced outwardly at an end opposite to said connecting wall, and a second connecting wall section connects said second heat loss reducing wall to said side wall from which it is spaced outwardly at an end opposite said connecting wall.

22. A heater according to claim 22 wherein said side walls each have a dimension between said two transversely spaced apart open ends which is at least two times greater than the dimension between said two side walls.

23. A heater according to claim 21 wherein the dimension between said connecting wall and said open end opposite said connecting wall is approximately equal to or slightly less than the dimension of said walls in the direction of the axis of the fiber.

24. A heater according to claim 21 wherein the dimension between said side walls at said open end opposite said connecting wall is less than the dimension between said side walls adjacent said connecting wall.

25. An electrically energizable high intensity radian energy heater operable in a controlled atmospheric environment generally in the absence of air and providing an isothermal high temperature region for fiber fusion and fiber processing, said heater comprising a ribbon of electrically resistively heated material which may be oxidizable in air, said heater having a pair of side walls which are spaced apart from each other by a distance to receive a fiber, a connecting wall connecting end portions of said side walls to form an elongate slot therebetween with an open end opposite said connecting wall and which slot forms an isothermal region therein.

26. A heater according to claim 27 wherein said side walls have a dimension in the direction of the fiber axis which is substantially greater than the distance between said walls.

27. A heater according to claim 28 wherein said side walls have a dimension in the direction of the axis of the fiber which is at least two times greater than the dimensions between said side walls.

28. A heater according to claim 26 wherein the dimension between said side walls at said open end is less than the dimension between said side walls adjacent said connecting end wall.

29. A heater according to claim 25 wherein a first additional wall is spaced outwardly from one of said side walls and a second additional wall is spaced outwardly from the other of said side walls to provide radiant shielding and buffering of the isothermal high temperature region.

30. A heater according to claim 29 wherein additional connecting wall sections spaced oppositely to said first mentioned connecting wall respectively connect said additional walls to said side walls from which they are spaced outwardly.

31. A method of drawing a fiber for local elongation thereof, comprising the steps of:
 (a) initially placing the fiber under tension;
 (b) introducing the fiber into a high temperature isothermal heating region and heating the fiber to a temperature at least near its melting point temperature;
 (c) placing the fiber under tension while in the region and stretching it; and
 (d) cooling the region to preclude further elongation of the fiber.

32. A method according to claim 31 further comprising the step of pre-heating the fiber to a temperature less than its melting point temperature prior to said step of initially placing the fiber under tension.

33. A method according to claim 31 further including the step of radiant heat shielding and buffering the high temperature isothermal heating region from heat loss.

* * * * *